(12) United States Patent
Jiang

(10) Patent No.: US 8,472,616 B1
(45) Date of Patent: Jun. 25, 2013

(54) SELF CALIBRATION OF ENVELOPE-BASED ACOUSTIC ECHO CANCELLATION

(75) Inventor: Ye Jiang, Sunnyvale, CA (US)

(73) Assignee: Audience, Inc., Mountain View, CA (US)

( * ) Notice: Subject to any disclaimer, the term of this patent is extended or adjusted under 35 U.S.C. 154(b) by 473 days.

(21) Appl. No.: 12/435,322

(22) Filed: May 4, 2009

Related U.S. Application Data

(60) Provisional application No. 61/166,200, filed on Apr. 2, 2009.

(51) Int. Cl.
*H04B 3/20* (2006.01)
*H04M 9/08* (2006.01)

(52) U.S. Cl.
USPC .................. 379/406.01; 381/66; 370/286

(58) Field of Classification Search
USPC .. 381/66, 93, 94.1, 94.3; 379/406.01–406.16; 370/282–286
See application file for complete search history.

(56) References Cited

U.S. PATENT DOCUMENTS

| 5,587,998 A * | 12/1996 | Velardo et al. ................ 370/289 |
| 6,968,064 B1 * | 11/2005 | Ning ............................... 381/66 |
| 2010/0042406 A1 * | 2/2010 | Johnston et al. ........... 704/200.1 |

* cited by examiner

*Primary Examiner* — Matthew Landau
*Assistant Examiner* — Khaja Ahmad
(74) *Attorney, Agent, or Firm* — Carr & Ferrell LLP

(57) ABSTRACT

Systems and methods for envelope-based acoustic echo cancellation in a communication device are provided. In exemplary embodiments, a primary acoustic signal is received via a microphone of the communication device, and a far-end signal is received via a receiver. Frequency analysis is performed on the primary acoustic signal and the far-end acoustic signal to obtain frequency sub-bands. An echo mask based on magnitude envelopes of the primary and far-end acoustic signals for each frequency sub-band is generated. A noise mask based on at least the primary acoustic signal for each frequency sub-band may also be generated. A combination of the echo mask and noise mask may then be applied to the primary acoustic signal to generate a masked signal. The masked signal is then output.

25 Claims, 9 Drawing Sheets

SELF CALIBRATION OF ENVELOPE-BASED ACOUSTIC ECHO CANCELLATION

CROSS REFERENCE TO RELATED APPLICATIONS

This application claims the benefit of U.S. Provisional Application No. 61/166,200, filed on Apr. 2, 2009, entitled "Self Calibration of Envelop-Based Acoustic Echo Cancellation," having inventor Ye Jiang et al, which is hereby incorporated by reference in its entirety.

BACKGROUND OF THE INVENTION

When using a communication device such as a cellular phone to communicate with a far end source, echo occasionally develops in a connection. For example, when audio from a far-end environment is output through a speaker of a near-end communication device, the far-end audio signal which is output locally may be picked up by microphones or other audio sensors of the near-end communication device. As such, the sounds from the far-end audio signal may be sent back to the far-end environment, resulting in an echo to a far-end listener.

Conventionally, acoustic echo cancellation (AEC) systems may take the far-end audio signal and use it to predict the echo of the far-end audio signal (after being played through the speaker and picked up by the microphone). Typically, a transfer function that describes a path from the far-end audio signal, through the speaker, through an acoustic environment, and back to the microphone is linearly modeled to predict the echo. These AEC systems are performed in a waveform domain whereby the echo is predicted, inverted, delayed, and subtracted out from a near-end audio signal.

Many problems exist with conventional AEC systems. First, the transfer function (i.e., relationship between the far-end audio signal and the echo) is typically constantly changing, since the acoustic environment is rarely fixed. In the case of a handheld communication device (e.g., a cellular phone), there may also be reflections of an audio signal off a face of a user. The prior art AEC systems are adaptive and continually update the transfer function. However, errors usually occur in the echo prediction due to the changing environment. If the echo prediction is even slightly incorrect, or an applied delay is incorrect, residual echo will remain.

A second disadvantage is that these prior art AEC systems typically use a linear model (i.e., linear filter) to predict the echo. However, the transfer function is often not linear (e.g., there may be non-linearities in the speaker which may cause distortion). As a result, poor echo prediction may occur.

Other AEC systems may attempt to overcome this disadvantage by introducing non-linearity to the echo prediction model. However, this results in more complexity. For example, non-linearity may become problematic in cellular phones or speakerphones with cheap components. The prediction may be difficult to obtain unless an exact model of the speaker (e.g., of the cellular phone or speakerphone) is known.

SUMMARY OF THE INVENTION

Embodiments of the present technology overcome or substantially alleviate prior problems associated with acoustic echo cancellation processing. Exemplary embodiments of the present technology utilize magnitude envelopes of acoustic signals to determine an echo envelope. An echo gain may then be generated based on the envelope of a local or primary acoustic signal and the envelope of a far-end signal. The echo gain can be configured based on coherence between a local or primary acoustic signal and a far-end signal. The echo gain adaptation speed can be adjusted based a ratio between the near end acoustic signal and the far-end acoustic signal. Computation of the coherence can be based on cochlea filters output.

In exemplary embodiments, a primary acoustic signal is received via a microphone of the communication device, and a far-end signal is received via a receiver. Because a speaker may provide audio (the far-end signal) that may be picked up by the microphone, the acoustic signal received by the microphone may include speaker leakage. As such, acoustic echo cancellation (AEC) is applied to the acoustic signal to obtain an AEC masked signal.

In an embodiment, acoustic echo cancellation can be performed by receiving a primary acoustic signal from a primary microphone and a far-end signal through a receiver. An echo mask can be configured based on a coherence between the primary acoustic signal and the far-end signal. The echo mask can be applied to the primary acoustic signal to generate a masked signal and the masked signal can be output.

In an embodiment, acoustic echo cancellation can be performed by receiving a primary acoustic signal via a primary microphone and a far-end signal via a receiver. An echo gain can be adapted based on the primary acoustic signal and the far-end signal. The speed of the echo gain adaptation can be adjusted based on the ratio between the primary acoustic signal and the far-end signal. The echo mask can be applied to the primary acoustic signal to generate a masked signal. The generated masked signal can be output.

An embodiment can perform acoustic echo cancellation by receiving a primary acoustic signal via a primary microphone and a far-end signal via a receiver. A coherence between the primary acoustic signal and the far-end signal can be determined from cochlea filter output. An echo gain can be configured based on the coherence. The echo mask can be applied to the primary acoustic signal to generate a masked signal which is output.

A system for envelope-based acoustic echo cancellation in a communication device can include acoustic sensors, an echo mask generator, a modifier module and an output device. The acoustic sensors can be configured to receive a primary acoustic signal and a far-end acoustic signal. The echo mask generator can be configured to generate an echo mask based on a coherence between the primary acoustic signal and far-end acoustic signal. The modifier module can apply the echo mask to the primary acoustic signal to generate a masked signal that is output by the output device.

DESCRIPTION OF EXEMPLARY EMBODIMENTS

The present technology provides exemplary systems and methods for providing envelope-based acoustic echo cancellation (EnvAEC). Exemplary embodiments perform the EnvAEC based on frequency sub-bands and prediction envelopes of echo waveforms, as opposed to details of actual echo waveforms. The envelopes, thus, show how energy in the waveforms may change over time.

Embodiments of the present technology overcome or substantially alleviate prior problems associated with acoustic echo cancellation processing. The present technology utilizes magnitude envelopes of acoustic signals to determine an echo envelope. An echo mask may then be generated based on the echo envelope. The gain mask can be configured based on coherence between a local or primary acoustic signal and a far-end signal.

The gain mask configuration or adaption based on coherence is level independent and adaptive to an actual echo path to achieve echo cancellation. The coherence can be normalized to make the coherence independent of signal level. The speed of echo gain adaptation can be adjusted based a ratio between the near end acoustic signal and the far-end acoustic signal. The echo gain adaption can be based on the coherence of the far end signal with respect to a particular sub-band as well as the entire near end signal. Computation of the coherence can be based on cochlea filters output.

Exemplary embodiments are configured to reduce and/or minimize effects of speaker signal leakage to one or more microphones in such a way that the far-end environment does not perceive an echo. While the following description will be discussed using a two microphone system, it should be noted that embodiments of the present technology may be applied to a single microphone envelope-based acoustic echo cancellation system.

Embodiments of the present technology may be practiced on any device that is configured to receive audio such as, but not limited to, cellular phones, phone handsets, headsets, personal digital assistants, and conferencing systems. While embodiments of the present technology will be described in reference to operation on a speakerphone, the present technology may be practiced on any audio device.

Figure 1:
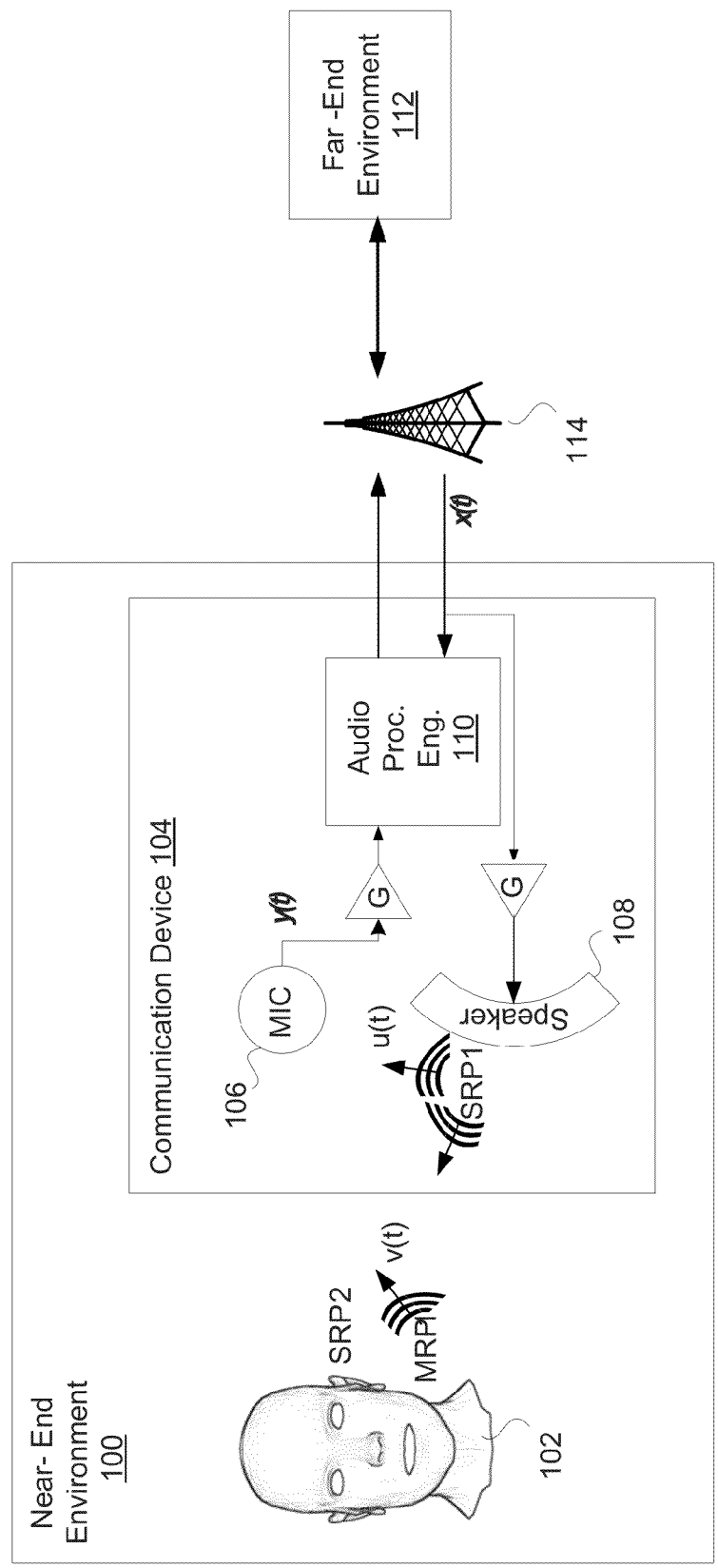
FIG. 1 is an environment in which embodiments of the present technology may be practiced.

FIG. 1 is an environment in which embodiments of the present technology may be practiced. A user in a near-end environment 100 acts as an acoustic source 102 to a communication device 104. In some embodiments, a mouth of the user comprises a point near a mouth of the acoustic source 102, while a speaker comprises a point near an ear of the acoustic source 102.

The exemplary communication device 104 comprises a microphone 106 (i.e., primary microphone), speaker 108, and an audio processing system 110 including an acoustic echo cancellation mechanism. The microphone 106 is configured to pick up audio from the acoustic source 102, but may also pick up noise from the near-end environment 100. The audio received from the acoustic source 102 will comprise a near-end microphone signal y(t), which will be sent back to a far-end environment 112.

In some embodiments, one or more additional microphones (not shown) may be present in the communication device 104. The one or more additional microphones may be located a distance away from the primary microphone 106. In some embodiments, the microphone(s) may comprise omnidirectional microphones.

An acoustic signal x(t) comprising speech from the far-end environment 112 may be received via a communication network 114 by the communication device 104. The received acoustic signal x(t) may then be provided to the near-end environment 100 via the speaker 108. The audio output from the speaker 108 may leak back into (i.e., be picked up by) the microphone 106. This leakage may result in an echo perceived at the far-end environment 112.

The exemplary audio processing system 110 is configured to remove u(t) (i.e., echoes of x(t)) from y(t), while preserving a near-end voice signal v(t). In exemplary embodiments, the removal of u(t) is performed without introducing distortion to a far-end listener. This may be achieved by calculating and applying time and frequency varying multiplicative gains or masks that render the acoustic echo inaudible. Ideally, the gains are less than 1 (i.e., less than 0 dB) to result in signal attenuation. In various embodiments, the attenuation is strong when echo dominates over other components of the signal.

Figure 2:
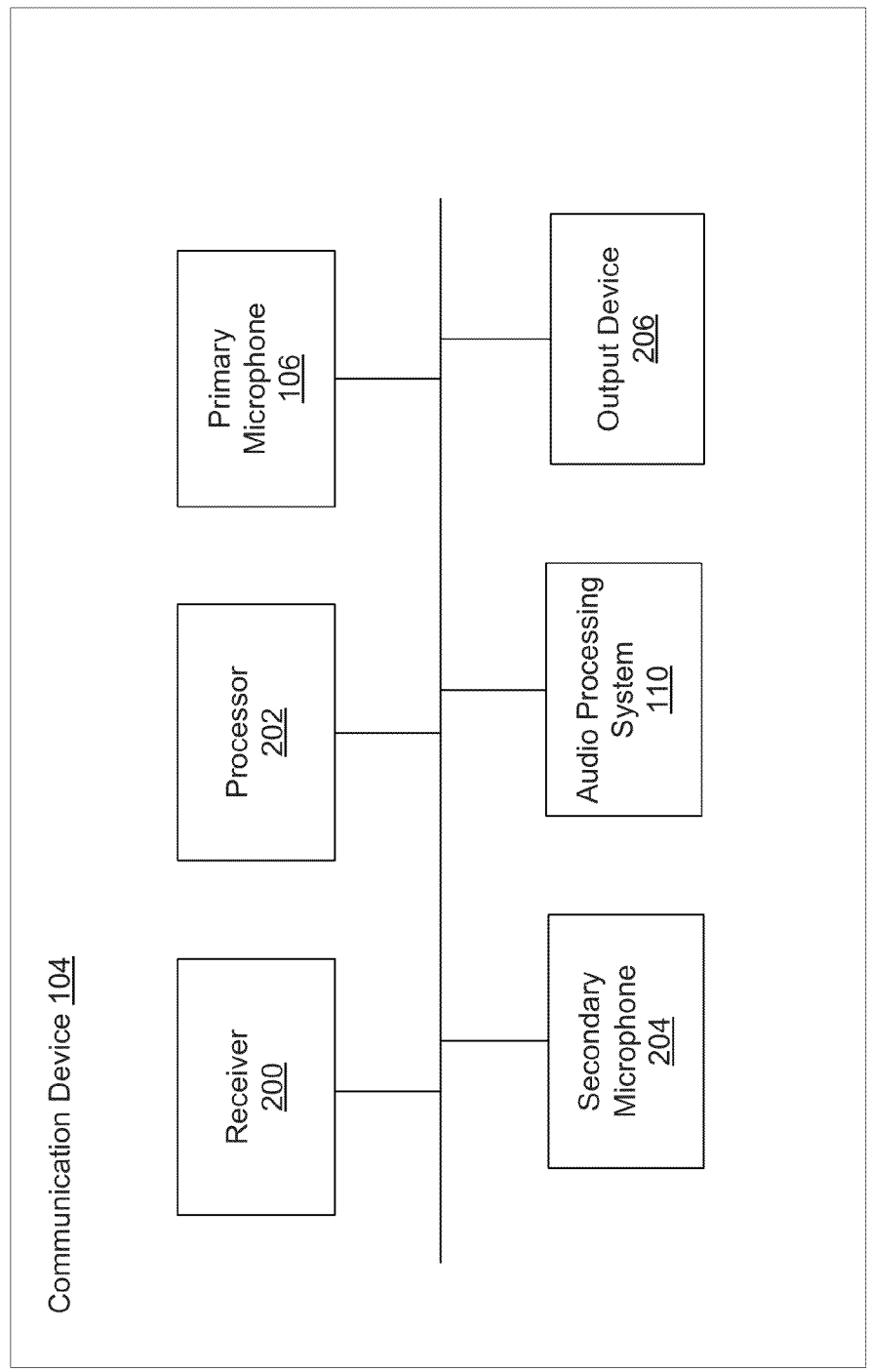
FIG. 2 is a block diagram of an exemplary communication device implementing embodiments of the present technology.

Referring now to FIG. 2, the exemplary communication device 104 is shown in more detail. In exemplary embodiments, the communication device 104 is an audio receiving device that comprises a receiver 200, a processor 202, the primary microphone 106, an optional secondary microphone 204, the audio processing system 110, and an output device 206. The communication device 104 may comprise more or other components necessary for communication device 104 operations. Similarly, the communication device 104 may comprise fewer components that perform similar or equivalent functions to those depicted in FIG. 2.

Processor 202 may include one or more processors that may execute software stored in memory to perform the methods and operations discussed herein. For example, processor 202 can execute software stored in memory to implement the methods performed by audio processing system 110.

The exemplary receiver 200 is an acoustic sensor configured to receive the far-end signal x(t) from the network 114. In some embodiments, the receiver 200 may comprise an antenna device. The received far-end signal x(t) may then be forwarded to the audio processing system 110 and the output device 206.

The audio processing engine 110 can receive the acoustic signals from the acoustic source 102 via the primary and optional secondary microphones 106 and 204 (e.g., primary and secondary acoustic sensors) and process the acoustic signals. The primary and secondary microphones 106 and 204 may be spaced a distance apart in order to allow for an energy level differences between them. After reception by the microphones 106 and 204, the acoustic signals may be converted into electric signals (i.e., a primary electric signal and a secondary electric signal). The electric signals may themselves be converted by an analog-to-digital converter (not shown) into digital signals for processing in accordance with some embodiments. In order to differentiate the acoustic signals, the acoustic signal received by the primary microphone 106 is herein referred to as the primary acoustic signal, while the acoustic signal received by the secondary microphone 204 is herein referred to as the secondary acoustic signal. It should be noted that embodiments of the present technology may be practiced utilizing any number of microphones. In exemplary embodiments, the acoustic signals from the secondary microphone 204 are used for total noise estimation as will be discussed further below.

Output device 206 provides an audio output to a listener (e.g., the acoustic source 102). For example, output device 206 may comprise speaker 108, an earpiece of a headset, or handset on the communication device 104.

In various embodiments, where the primary and secondary microphones are omni-directional microphones that are closely-spaced (e.g., 1-2 cm apart), a beamforming technique may be used to simulate a forwards-facing and a backwards-facing directional microphone response. A level difference may be obtained using the simulated forwards-facing and the backwards-facing directional microphone. The level difference may be used to discriminate speech and noise in the time-frequency domain which can be used in noise estimation.

Figure 3:
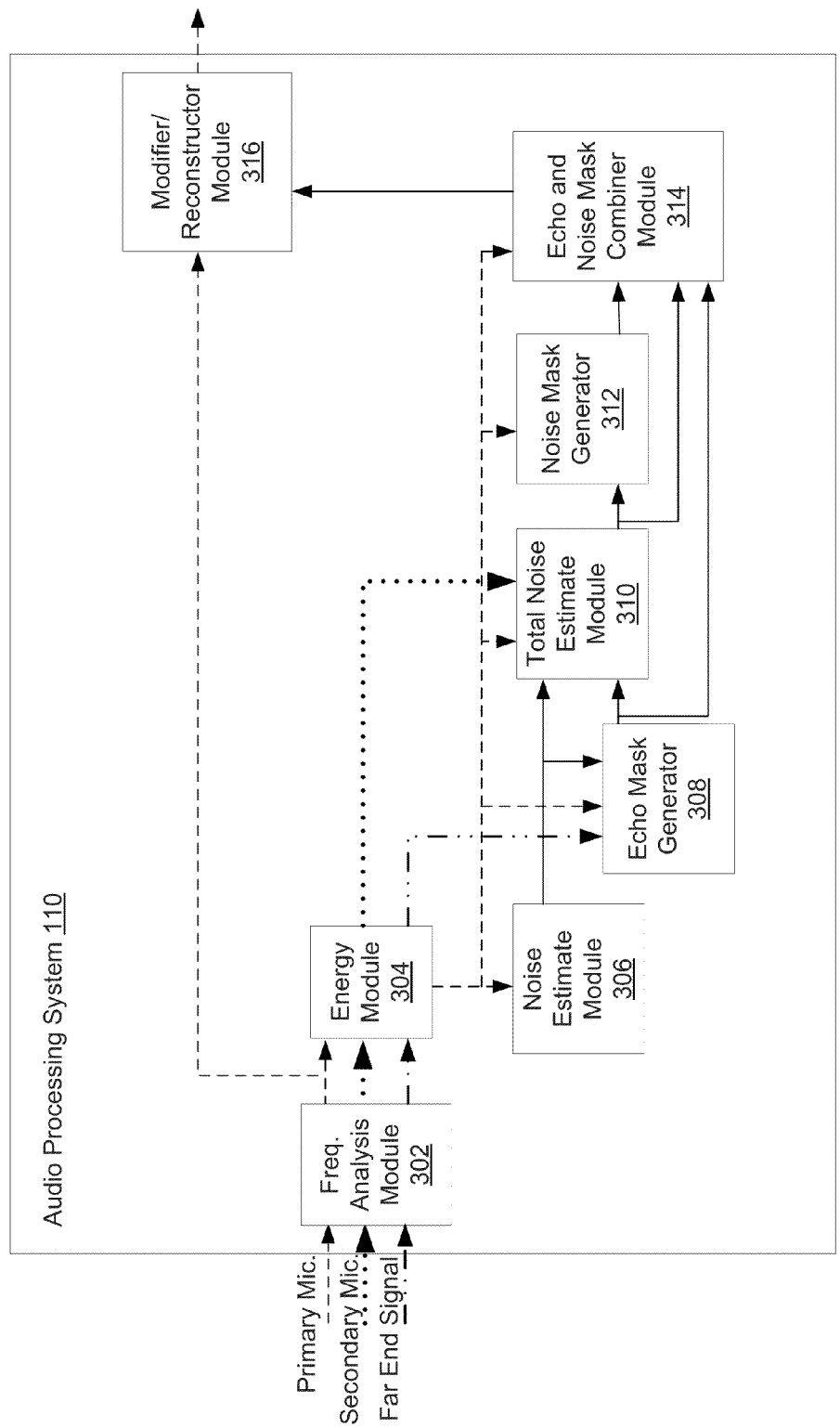
FIG. 3 is a block diagram of an exemplary audio processing system.

FIG. 3 is a detailed block diagram of the exemplary audio processing system 110, according to exemplary embodiments of the present technology. The audio processing engine 110 can be embodied as software that is stored on memory or other electronic storage and can be executed by processor 202. The exemplary audio processing system 110 provides acoustic echo cancellation (AEC) and noise suppression. As a result, an acoustic signal sent from the communication device 104 to the far-end environment 112 comprises noise suppression as well as reduced or eliminated echo from speaker leakage. In accordance with one embodiment, the audio processing system 110 may comprise a frequency analysis module 302, an energy module 304, a noise estimate module 306, an echo mask generator 308, a total noise estimate module 310, a noise mask generator 312, an echo and noise mask integration module 314, and a modifier/reconstructor module 316.

In operation, the acoustic signals received from the primary and secondary microphones 106 and 204 and the far-end acoustic signal x(t) are converted to electric signals and processed through the frequency analysis module 302. The frequency analysis module 302 takes the acoustic signals and mimics the frequency analysis of the cochlea (i.e., cochlear domain) simulated by a filter bank. In one embodiment, the frequency analysis module 302 separates the acoustic signals into frequency bands or sub-bands. Alternatively, other filters such as short-time Fourier transform (STFT), Fast Fourier Transform, Fast Cochlea transform, sub-band filter banks, modulated complex lapped transforms, cochlear models, a gamma-tone filter bank, wavelets, or any generalized spectral analysis filter/method, can be used for the frequency analysis and synthesis.

Because most sounds (e.g., acoustic signals) are complex and comprise more than one frequency, a sub-band analysis on the acoustic signal may be performed to determine what individual frequencies are present in the acoustic signal during a frame (e.g., a predetermined period of time). According to one embodiment, the frame is 5-20 ms long (e.g., 40 to 160 samples for a system audio sampling rate of 8000 Hz). Alternative embodiments may utilize other frame lengths. Data may be pushed through the audio processing system 110 in these frames (i.e., blocks of buffered samples).

The output of the frequency analysis module 302 comprises a plurality of waveforms. Thus, if the acoustic signal comprises high frequency bands, the resulting waveforms are more energetic. As will be discussed further below, the envelopes of these waveforms in these frequency bands are analyzed for echo suppression. Specifically, the envelopes of the far-end acoustic signal are used to predict the echo envelopes that will be present in the near-end acoustic signal (e.g., primary acoustic signal).

Once the frequencies are determined, the signals are forwarded to the energy module 304 which computes energy/power estimates for the primary, secondary, and far-end acoustic signals during an interval of time for each frequency sub-band (i.e., power estimates). As such an average power output for each frequency sub-band (i.e., power spectrum) may be calculated for each of the acoustic signals in frames. In exemplary embodiments, the frames comprise 5 ms time periods. Thus, buffers are filled up with 5 ms of output data from frequency analysis module 302. An average power per frame may then be determined.

The exemplary energy module 304 is a component which, in some embodiments, can be represented mathematically by the following equation:

$$E(t,\omega) = \lambda_E |X(t,\omega)|^2 + (1-\lambda_E)E(t-1,\omega)$$

where $\lambda_E$ is a number between zero and one that determines an averaging time constant, $X(t,\omega)$ is the acoustic signal being processed (e.g., the primary, secondary, or far-end acoustic signal) in the cochlea domain, $\omega$ represents the frequency, and t represents time. Given a desired time constant T (e.g., 4 ms) and sampling frequency $f_s$ (e.g., 16 kHz), the value of $\lambda_E$ can be approximated as $$\lambda_E = 1 - e^{-\frac{1}{T f_s}}$$

As provided, the energy level for the acoustic signal, $E(t,\omega)$, is dependent upon a previous energy level of the acoustic signal, $E(t-1,\omega)$.

The exemplary noise estimate module 306 is configured to determine a noise estimate based on the primary acoustic signal. In some embodiments, this noise estimate module 306 may produce a stationary noise estimate based on constant ambient noise in the near-end environment 100. This stationary noise estimate may be later augmented by non-stationary noise components as a function of both the primary microphone 106 and the optional secondary microphone 204.

In one embodiment, the noise estimate module 306 comprises a minimum statistics tracker (MST) which receives the energy of the primary acoustic signal from the signal path for processing. The determination of the noise estimate, according to one embodiment, is discussed in more detail in connection with U.S. patent application Ser. No. 12/072,931 entitled "System and Method for Providing Single Microphone Noise Suppression Fallback," which is incorporated by reference. The noise estimate is then provided to the echo mask generator 308 and the total noise estimate module 310.

The exemplary echo mask generator 308 is configured to generate an echo mask that will render echo inaudible. The echo mask is generated based on predicted envelopes (of the echo waveforms) based on the far-end acoustic signal. By analyzing the near-end signal (e.g., primary acoustic signal) and the predicted envelopes, a determination may be made as to where and when echo may be audible in frequency sub-bands. Echo suppression may then be applied to these frequency sub-bands. The output of the echo mask generator 308 comprises a gain value per frequency sub-band and frame. Adaption of the gain value may be based on coherence between the far end acoustic signal and the near end signal. The echo mask generator 308 will be discussed in more detail in connection with FIG. 4A.

The result of the echo mask generator 308 along with the noise estimate and the optional secondary acoustic signal energy are forwarded to the total noise estimate module 310. In some embodiments, the total noise estimate module 310 may comprise an echo-free noise estimate module. The total noise estimate module 310 is configured to compute an estimate of the near-end noise power spectra (e.g., time and frequency dependent portion of the acoustic signal that is not from the acoustic source 102). In exemplary embodiments, the total noise estimate module 310 refines the noise estimate received from the noise estimate module 306, which may be corrupted by echo power.

The results from the total noise estimate module 310 may then be used by the noise mask generator 312 to determine a noise suppression gain mask. Various embodiments of the exemplary total noise estimate module 310 and the exemplary noise mask generator 312 are further discussed in U.S. patent application Ser. No. 12/004,899 filed Dec. 21, 2007 and entitled "System and Method for 2-Channel and 3-Channel Acoustic Echo Cancellation," and U.S. patent application Ser. No. 12/004,896 filed Dec. 21, 2007 and entitled "System and Method for Blind Subband Acoustic Echo Cancellation Post-filtering" which are both hereby incorporated by reference.

In some embodiments, the echo mask may be refined in each sub-band to reduce near-end speech distortion. In exemplary embodiments, the echo and noise mask integration module 314 takes into account the near-end noise level (from the echo-free noise estimate determined by the total noise estimate module 310) and the noise suppression gain mask (from the noise mask generator 312). In various embodiments, the echo mask may be limited such that a total output power is not more than a certain amount (e.g., 6 dB) below the output noise power that will be produced by applying the noise suppression gain mask to the near-end noise. This process may reduce perception of output noise modulation correlated with the echo, while still ensuring the echo remains inaudible.

The echo mask is combined with the noise mask by the echo and noise mask integration module 314. In one embodiment, the echo and noise mask integration module 314 may select a minimum between the two gain masks (i.e., noise mask and echo mask) for each sub-band, with a lower limit on how far below the noise mask the combined mask can be. A possible mathematical description of this combination operation is:

$$g_{tot} = \min(g_N, \max(g_E, g_N \sqrt{P_x/P_y} \cdot \gamma)),$$

where $g_{tot}$ a final gain mask, min(x,y) is a minimum of x and y, max(x,y) is a maximum of x and y, $g_N$ is the noise mask, $g_E$ is the echo mask, $P_y$ is the total power in the frame, $P_n$ is the estimated noise power in the frame, and γ is maximum tolerated modulation on the output noise. For example, if the amount of tolerated modulation is −6 dB (i.e., 6 dB down), γ will equal $10^{-6/20}$ or around 0.5.

The noise mask is produced from the total noise estimate and may be defined such that the noise power is reduced at the system output but not rendered completely inaudible. As such, the echo and noise mask integration module 314 may be used to negotiate different objectives of the noise suppression and echo cancellation masks. Furthermore, it should be noted that the final gain mask may be defined such that no noise reduction, or at least multiplicative noise masking, is performed in the system. This is equivalent to taking the noise mask generator 312 out of the audio processing system 110. The result is a final gain mask that may be used for modification of the primary acoustic signal from the primary microphone 106. Accordingly in exemplary embodiments, gain masks may be applied to an associated frequency band of the primary acoustic signal in the modifier/reconstructor module 316.

Next, the post-AEC and noise suppressed frequency bands are converted back into time domain from the cochlea domain. The conversion may comprise taking the post-AEC and noise suppressed frequency bands and adding together phase shifted signals of the cochlea channels in the modifier/reconstructor module 316. In one embodiment, the reconstruction portion of the modifier/reconstructor module 316 comprises a frequency synthesis module. Once conversion is completed, the synthesized, masked acoustic signal may be output (e.g., forwarded to the communication network 114 and sent to the far-end environment 112).

In the embodiment of FIG. 3, the stationary and non-stationary noise estimates are calculated separately. This architecture is advantageous in situations where cues being used to estimate the non-stationary noise components are not able to discriminate echo from ambient noise. In these situations, the input into the echo mask generator 308 may cause an adaptation control module to incorrectly freeze adaptation, as will be described further in connection with FIG. 4A. Thus, it may be desirable to utilize noise estimation components, such as stationary noise, that are not likely to be strongly corrupted by the echo in the echo mask generator 308. Subsequently, since the echo mask generator 308 output indicates frames and frequencies where echo dominates, the output may be taken into account for a "total noise estimate" operation. One example of this is to freeze update of the noise estimate when the echo mask indicates echo is dominating the signal.

It should be noted that the system architecture of the audio processing system 110 of FIG. 3 is exemplary. Alternative embodiments may comprise more components, fewer components, or equivalent components and still be within the scope of embodiments of the present technology.

Figure 4A:
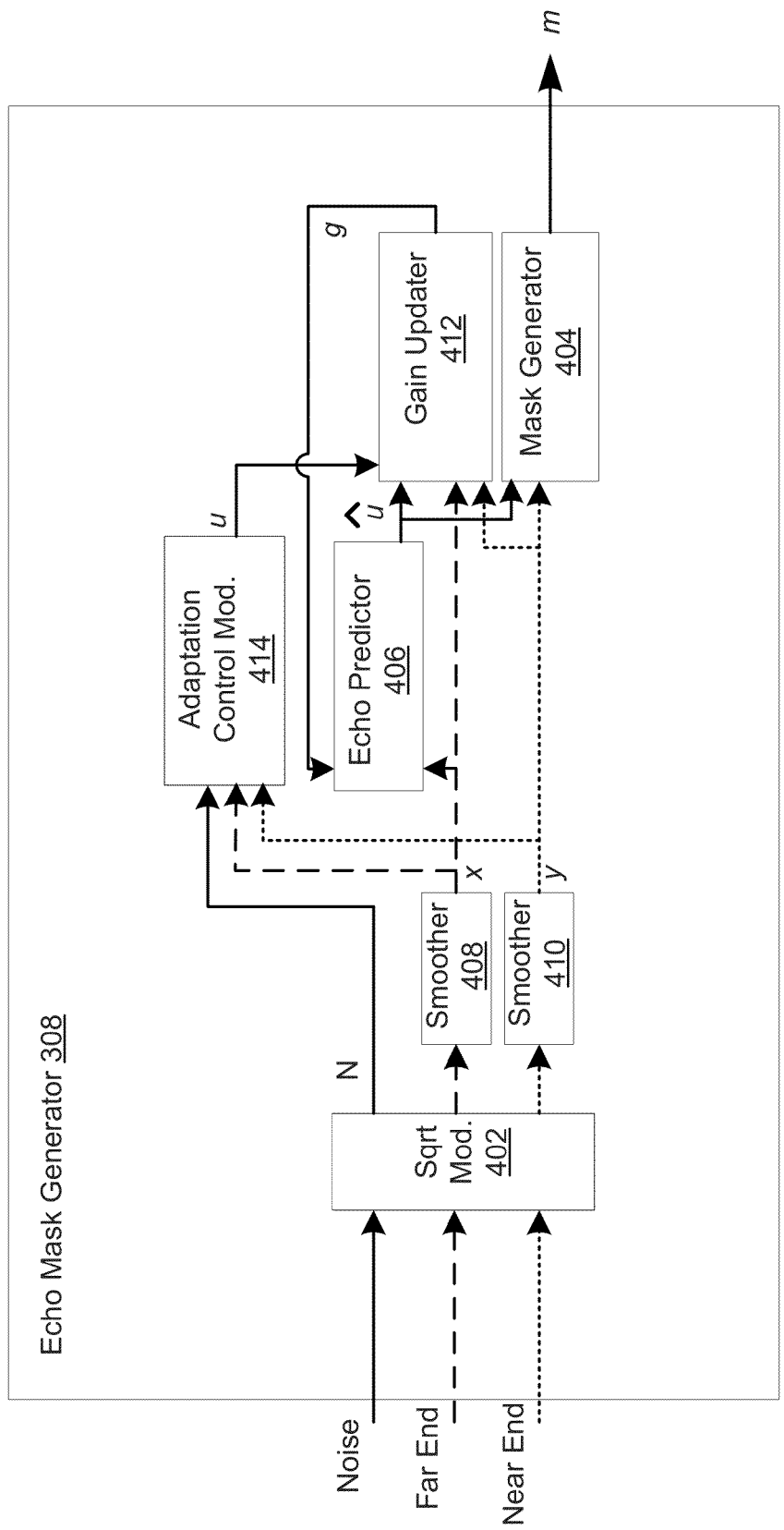
FIG. 4A is a block diagram of an echo mask generator.

Referring now to FIG. 4A, a block diagram of the echo mask generator 308 is shown. The echo mask generator 308 is configured to generate an echo mask which will attenuate a far-end echo (ideally to render the far-end echo inaudible) while minimizing disturbance of near-end sources. In exemplary embodiments, the echo mask generator 308 receives as inputs per frame a power spectra of the near-end signal (e.g., primary acoustic signal), a power spectra of the far-end signal, and, optionally, a noise power spectrum estimate from the noise estimate module 306.

The inputs are then subjected to a square-root (sqrt) operation in the sqrt module 402. The sqrt operation transforms the power spectrum into magnitudes. For a given frequency band, a sequence of such magnitudes over time comprises an envelope, or one amplitude per frame.

In exemplary embodiments, a prediction of an echo in a near-end envelope is used to determine whether the near-end envelope is dominated by echo to a point that the echo is audible. The prediction may be based on the far-end signal (and thus the far-end envelope). For example, if there is no energy in the far-end envelope, there is likely no echo and thus no echo suppression. However, if there is energy both in the far-end and the near-end envelopes, an echo within the near-end envelopes is more likely. In these examples, echo suppression will be applied. The echo mask generator 308 comprises logic which analyzes the prediction versus an observation in order to determine where and when to apply echo suppression.

In some embodiments, the amount of echo suppression may be limited by perceptual effects. For example, if a loud sound is followed by a soft sound in quick succession, forward masking may occur whereby the soft sound is not really perceived. In this situation, suppression may not be necessary.

The determination of whether the near-end envelope is dominated by echo may occur in a mask generator 404. If the echo is audible, the mask generator 404 will have a low gain value (e.g., 0). Otherwise, the mask generator 404 may have an "all pass" gain value (e.g., 1). A mathematical representation of this determination is $$m = H\left[\frac{y^2 - \hat{u}^2}{\hat{u}^2} - \tau_1\right], \quad (1)$$

where m is the mask generated by the mask generator 404, y is the near-end envelope, û is the echo prediction, $\tau_1$ is a dominance threshold for a ratio of non-echo power to echo power, and H is a Heavyside step function (which is 1 if its input is greater than 1 and 0 otherwise). A reasonable value for $\tau_1$, for example, is 1 (0 dB). The lower $\tau_1$ is, the higher the echo power has to be relative to the total power before it is attenuated.

An echo predictor 406 is configured to use the far-end envelope (per frequency band) to predict its echo in the near-end envelope. In one embodiment, the echo predictor 406 may be simplified by assuming that the echo envelope is just a delayed and scaled version of the far-end envelope. Mathematically, this assumption may be represented by $$\hat{u}(n) = g \cdot x(n-d) \quad (2)$$

where g is a scale factor, n is a frame index, and d is a number of frames delayed. In some embodiments, this representation may provide an accurate estimate due to low temporal resolution of the envelope (which is bolstered by smoothing). This allows the prediction to be robust to changes in the delay and echo tail length. Often, the number of frames delayed d can be measured and stored as a priori information. In other embodiments, d may be estimated during operation (e.g., by finding a peak of a cross-correlation between the near-end and far-end signals).

It may also be possible to extend the prediction to a multiple reflection model, such as $$\hat{u}(n) = \sum_d g(d) \cdot x(n-d), \quad (3)$$

where the echo is predicted as a summation of far-end echoes at various delays and scale factors. However, in most embodiments, such an extreme model may not be necessary.

Smoothers 408 and 410 may smooth the magnitudes, and thus envelopes, of the far-end and near-end signals. The temporal smoothing removes "wiggles" in the envelope that may not be important for echo suppression. These "wiggles" if not removed, may result in glitches in the echo prediction. As a result, low temporal resolution can be further enforced by applying the temporal smoothing to the envelopes. An example of a simple form of smoothing is a leaky integrator, mathematically represented by, $$x(n) = \alpha \cdot x(n-1) + (1-\alpha) \cdot X(n), \quad (4)$$

where $\alpha$ is a smoothing factor and x is an unsmoothed envelope. In this embodiment, more smoothing is performed at higher $\alpha$. As a result, the system may be less susceptible to delay and echo tail changes.

Smoothing may also be beneficial for filtering out hard-to-predict non-linear interactions (e.g., "cross-terms") between the echo and other near-end signal components inconsequential to determining echo dominance. However, if too much smoothing is performed, the system may not react quickly enough for echo dynamics. An example of a reasonable value for $\alpha$ is 0.85 for a frame rate of 200 Hz, which corresponds to a time constant of around $1/(200*\ln(0.85)) \approx 30$ ms. For this value, the system is able to accurately predict the echo envelope, even if the echo tail is up to 600 ms long.

Exemplary embodiments are robust to changes in echo delay and tail length. As such, the accuracy of the echo prediction will be largely determined by the accuracy of the gain g. In most embodiments, this gain g may not be known a priori with enough precision, and so it must be estimated during operation. Further complicating matters, g can significantly change at any time due to echo path or speaker volume changes.

Thus, embodiments of the present technology adaptively estimate g using a gain updater 412. In some embodiments, g is updated quickly when echo is dominating the near-end signal, and updated slowly or not at all otherwise. In exemplary embodiments, an adaptation control module 414 provides the information necessary to determine how quickly to update g. In some embodiments, the information may come in a form of a frame- and frequency-varying parameter μ. The larger μ is, the faster g is updated.

Given μ, an efficient way of updating g is given by a normalized least-mean-square (NLMS) algorithm, such as, $$g_d(n+1) = g_d(n) + \frac{\mu \cdot x_d \cdot (y - \hat{u})}{x_d^2 + \Delta}, \quad (5)$$

where $x_d = x(n-d)$. d subscripts denote that the expression is valid for an a priori known delay d.

If a vector of delays is being considered in conjunction with the prediction model (3), there may be well known and simple extensions to Eq. (5) that apply. Additionally, $\Delta$ is a regularization parameter that slows the update of g when the far-end signal is small. Eq. (5) may be re-written, using (2), as $$g_d(n+1) = (1 - \mu\beta) \cdot g_d(n) + \mu\beta \cdot \frac{y}{x}, \quad (6)$$

where $$\beta = \frac{x^2}{x^2 + \Delta}$$

is between 0 and 1. Eq. (6) gives an intuitive explanation that the gain estimate is an adaptively smoothed version of a ratio of near-end to far-end envelopes. The output of the gain updater 412 may be fed back to the echo predictor 406 in the next frame. It should be noted that if any upper or lower limits on g are known a priori, these limits may be applied before passing the result to the echo predictor 406.

The exemplary adaptation control module 414 is configured to notify the gain updater 412 when and how fast to safely adapt the gain g via the parameter μ (which can be between 0 and 1 with 1 being the fastest). In exemplary embodiments, adaption control module 414 determines when the echo sufficiently dominates the near-end signal (e.g., when the ratio y/x in Eq. (6) is a meaningful observation of g). The output of the adaptation control module 414 encapsulates an adaptation speed.

Figure 4B:
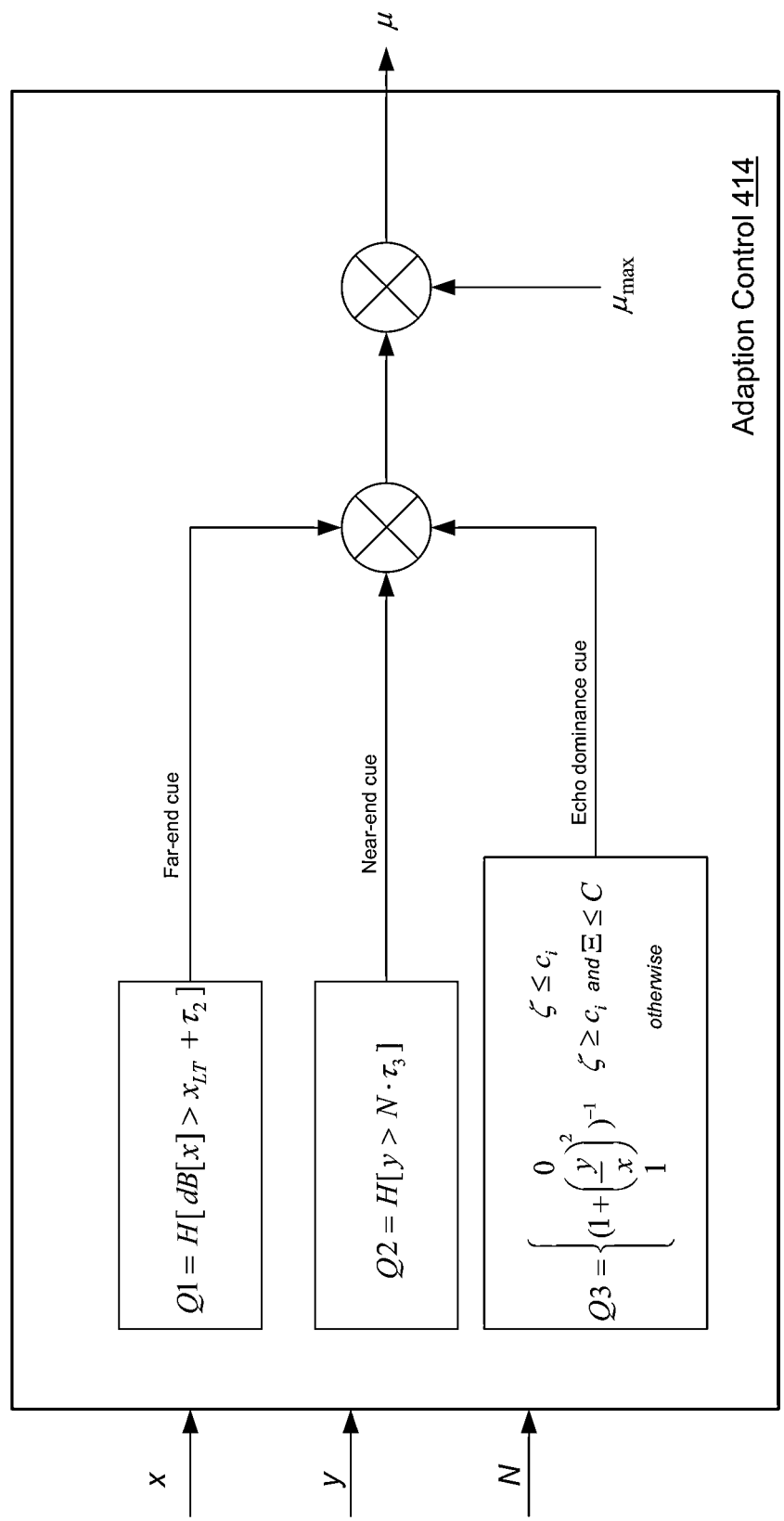
FIG. 4B is a block diagram of an exemplary adaption control module.

FIG. 4B is a block diagram of an exemplary Adaptation Control Module 414 in FIG. 4A. The input x and y are the smoothed far-end and near-end and envelopes, respectively, from smoother 408 and smoother 410. The input N is the noise power spectrum input received from square root module 402. The output μ is the step size in the NLMS equation for a gain updater.

The output μ is determined by a far-end cue Q1, near-end cue Q2 and echo dominance cue Q3, all of which are determined from the three inputs received by adaption control 414. In accordance with some embodiments, multiple cues may be utilized to help strike a balance between updating too quickly (e.g., the system reacts erroneously to near-end sources) and updating too slowly (e.g., the system doesn't react quickly enough to echo path changes). These cues, as will be discussed below, provide outputs of either 0 or 1 or a value in between. Additionally, other cues can be used.

The adaptive far-end floor cue Q1 is an adaptive version of the Δ in Eq. (5) (i.e., an adaptive threshold on the far-end energy). As a result, only the most powerful times and frequencies of x enable fast adaptation, since the echo is most likely to dominate where x is its most powerful. One method of insuring this result is by performing a long-term average/smoothing of past values of x, and then determining whether or not the current value of x is far enough above the long term average $x_{LT}$.

Besides smoothing (e.g., Eq. (4)), an alternative method to produce $x_{LT}$ is to convert x to decibel units and apply a linear slew rate. This may be mathematically represented by, $$x_{LT}(n+1) = \begin{cases} x_{LT}(n) + \gamma_{up}; & dB[x(n)] > x_{LT}(n) \\ x_{LT}(n) - \gamma_{down}; & dB[x(n)] \leq x_{LT}(n) \end{cases}, \quad (7)$$

where dB[x] denotes a conversion of x to dB units. This method may result in smoother tracking behavior. Furthermore, independent control of upward and downward slew rates via $\gamma_{up}$ and $\gamma_{down}$ allows a user to control at what percentile in a range of x the long-term average settles (e.g., it is higher for higher ratios of $\gamma_{up}$ to $\gamma_{down}$). The output of this adaptive far-end floor cue can be represented as $$Q1 = H[dB[x] > x_{LT} + \tau_2], \quad (8)$$

where higher values of $\tau_2$ are more selective to higher values of dB[x].

The near-end noise floor cue Q2 utilizes a noise power spectrum input, N, such that adaptation is prevented if the near-end envelope is not high enough above the noise envelope. In these embodiments, echo cannot dominate the signal if the near-end envelope is not high enough above the noise envelope. Therefore, mathematically, $$Q2 = H[y > N\tau_3], \quad (9)$$

where higher values of $\tau_3$ require higher minimum dominance over the ambient noise.

The echo dominance cue Q3 determines if echo dominates the near-end signal to allow echo gain adaptation during signal; and to prevent echo gain adaption during double-talk. The determination process can be configured with (manual calibration) or without (self calibration) prior knowledge of the echo path gain.

In exemplary embodiments, the echo dominance cue (i.e., maximum gain cue) may be useful if there is an upper limit $g_{max}$ expected on the ratio y/x (the gain observation) if y is dominated by echo, while that maximum is often exceeded when y is dominated by near-end sources. In such an embodiment, a condition may be mathematically set such that $$Q3 = H[y < g_{max} x]. \quad (10)$$

In some embodiments, $g_{max}$ can be determined by a manual (i.e., offline) calibration procedure. During this procedure, $g_{max}$ is determined by placing the device (e.g. cell-phone or other device) in different usage scenarios and measuring the maximum observation of the ratio y/x.

Determination of $g_{max}$ depends on the level of far-end and near-end signals. Re-calibration is needed when a change is introduced in the gain chain (e.g., amplifier tuning) between far-end and near-end signals.

In some embodiments, the echo dominance cue Q3 can be self (i.e., online) calibrated. The self-calibration can be gain independent and adaptive to the actual echo path to achieve a dynamic trade-off between echo cancellation and double-talk voice quality.

The echo dominance cue Q3 can be configured from a coherence function and the ratio of envelope data for a far-end acoustic signal and a near-end acoustic signal.

As mentioned above, the echo dominance cue Q3 can be configured from a coherence function of two signals. A coherence function of two complex signals u and v can be defined as:

$$\xi(u, v) = \frac{E(uv^*)}{\sqrt{E(uu^*)E(vv^*)}} \quad (11)$$

Here, E( ) means taking an statistical expectation. In some embodiments, E( ) can be implemented by a leaky integration defined equation (4).

The self-calibration process can include measuring the coherence ξ between the far-end acoustic signal u and near-end signal acoustic signal v in each sub-band. The gain for the $i^{th}$ sub-band can be updated when the coherence $\xi_i$ for a sub-band i is high enough above or otherwise satisfies a certain threshold $c_i$. The value constant $c_i$ can differ between 0 and 1 based on different sub-band frequencies. Constant $c_i$ can have higher values for lower frequency bands than for higher frequency bands. For lower audible frequency sub-bands, the value of the constant $c_i$ can be about 0.6. For higher audible frequency sub-bands, the value of the constant $c_i$ can be about 0.4.

The coherence is normalized therefore independent of the signal level. As a result of the normalization, the self calibration can be robust to changes in the gain.

The adaption of the echo gain can be controlled to protect against near end attenuation during double-talk. Occasionally during double-talk, a far-end acoustic signal and a near-end acoustic signal comprise audio that correlate at a certain frequency region. In such cases, a high coherence value can indicate a false echo dominance locally, where mis-adaptation at full-speed (e.g., $\alpha_3$) can lead to gain divergence and thus distort the near-end speech.

The adaption speed control mechanism protects the near-end acoustic signal (e.g., the speech of the user of the audio device). In some embodiments, the adaption speed control can be implemented upon one or more conditions being satisfied. The conditions can include that a global coherence value Ξ is lower than a certain threshold C and a local coherence for a particular frequency sub-band is higher than threshold $c_i$. The global coherence value Ξ can be calculated as the average coherence value for many or all sub-bands of a frame. The value of the constant C can have values between 0 and 1, for example a value of 0.8. Determining the adaption speed based on both local and global coherence ensures fast convergence speed when one or more sub-bands indicate that the current frame is echo only.

If the local coherence $\xi_i$ for a particular frequency sub-band is higher than threshold $c_i$ and the global coherence value Ξ is less than C, echo dominance cue Q3 can be calculated as a value between 0 and 1. A function for the echo dominance cue for echo gain divergence protection can be defined as:

$$\alpha_3 = \left(1 + \left(\frac{y}{x}\right)^2\right)^{-1} \quad (12)$$

Alternative cues may be devised to increase robustness of the system. The final output of the adaptation control module 414 may be obtained by combining all of the cues and applying an absolute maximum on the update speed, according to exemplary embodiments. This may be mathematically represented by, $$\mu = Q1 \cdot Q2 \cdot Q3 \cdot \mu_{max}, \quad (13)$$

Determination of the cues of adaption control 414 can be multiplied together to determine a value. Thus, if any of the cues are set to zero, the value of $\mu$ will be set to zero. In some embodiments, the product of the cues can be multiplied by a constant $\mu_{max}$ to generate an output of $\mu$. The constant $\mu_{max}$ can have a value between 0 and 1, such as 0.35.

Since the complex cochlea filter bank outputs might not be down-sampled, coherence calculation according to equation (12) can include cross-correlation over complex samples for sub-bands. This can result in high computation complexity. In this technology, a down-sampled version of coherence estimation can also be defined as:

$$\tilde{\xi} = \frac{E(yx\exp(j(\theta_y - \theta_x)))}{\sqrt{E(y^2)E(x^2)}} \quad (14)$$

Here, an estimate of phase $\theta$ can have as few as two complex samples for each sub-band, and therefore greatly reduces the computational complexity. Coherence computation on the full sample rate cochlea filters output by equation (14) enables for more efficient use of device resources. In one embodiment, the full rate cochlea filters output can be 40 samples; therefore, the computation efficiency can be 20. The phase difference can be computed at a decimated version of the full-rate cochlea filter sub-bands output.

Figure 5:
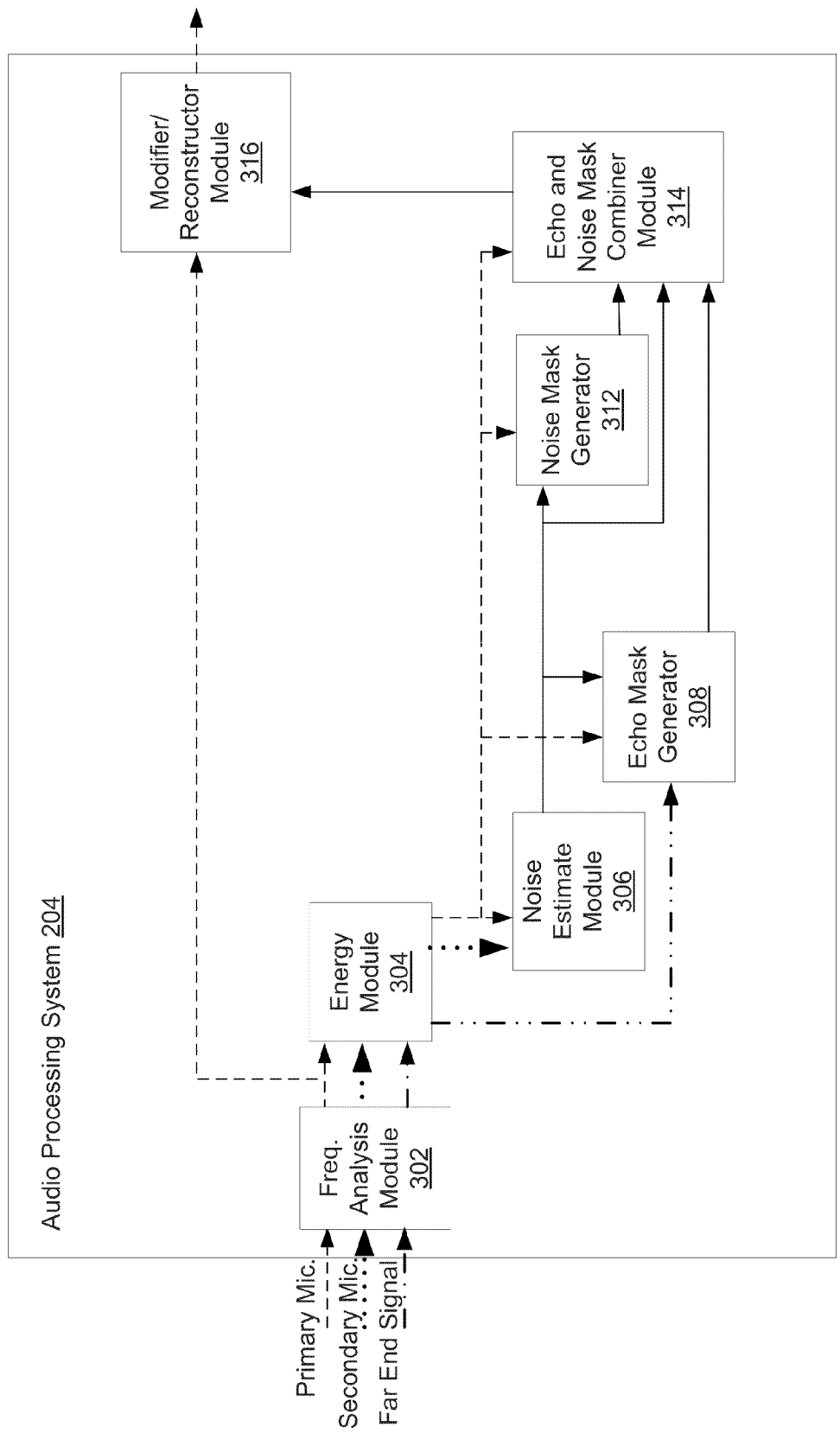
FIG. 5 is a block diagram of an alternative audio processing system.

An alternative embodiment of the audio processing system is shown in FIG. 5. In this embodiment, the total noise estimate module 310 is removed from the embodiment of FIG. 3. This embodiment may be utilized when the total noise estimate used in the system is not likely to be corrupted by echo. In one embodiment, the noise estimate may not be corrupted by echo when the system is designed to perform stationary noise reduction only. In this embodiment, the noise estimate from the noise estimate module 306 is the stationary noise estimate. In another embodiment, the noise estimate is not corrupted by echo when the non-stationary noise estimate is not corrupted by echo in a non-stationary noise reduction system. In these embodiments, there is no need for the echo mask generator 308 to influence the noise estimation process or for the second stage of the noise estimation (i.e., use of the total noise estimate module 310). Thus, the noise estimate module 306 may, in some embodiments, utilize the energy estimates for the primary and/or secondary acoustic signals to determine the noise estimate that will be used by the echo mask generator 308. The noise estimate is then provided to the echo mask generator 308 along with the energy from the far end signal. It should be noted that the embodiment of FIG. 5 may be applicable in situations where only the stationary noise component from the noise estimate module 306 is utilized or in situations where a noise estimate including both stationary and non-stationary noise components are utilized.

Figure 6:
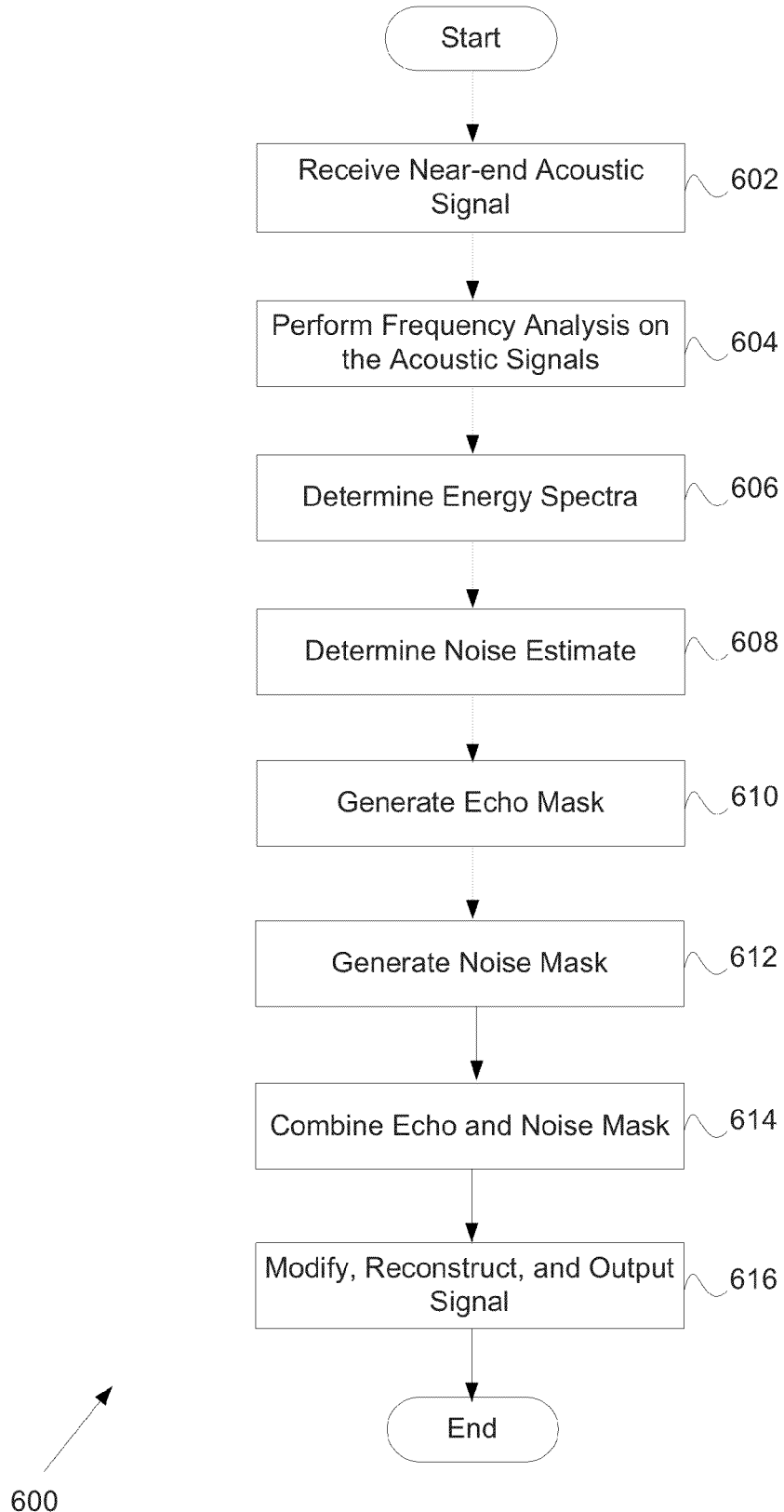
FIG. 6 is a flowchart of an exemplary method for envelope-based acoustic echo cancellation.

Referring now to FIG. 6, a flowchart 600 of an exemplary method for envelope-based acoustic echo cancellation is shown. In step 602, the acoustic signals are received by the communication device 104. In exemplary embodiments, a near-end acoustic signal is received by the primary microphones 106. A far-end acoustic signal may also be received via a receiver 200. If the far-end acoustic signal is being output through the speaker 108, then audio from the speaker 108 may leak back to the primary microphones 106. This may result in an echo being provided back to a listener at the far-end environment 112. In some embodiments, an optional secondary microphone 204 may also receive a secondary acoustic signal.

The acoustic signals are then converted to electric signals and processed through the frequency analysis module 302 to obtain frequency sub-bands in step 604. In one embodiment, the frequency analysis module 302 takes the acoustic signals and mimics the frequency analysis of a cochlea (i.e., cochlear domain) simulated by a filter bank. The result comprises frequency sub-bands.

In step 606, energy estimates for the acoustic signals are computed. In one embodiment, the energy estimates are determined by the energy module 304. The exemplary energy module 304 utilizes a present acoustic signal and a previously calculated energy estimate to determine the present energy estimate for each acoustic signal at each frequency sub-band.

Subsequently, the noise estimate is determined in step 608. According to embodiments of the present technology, the noise estimate for each frequency sub-band is based on the acoustic signal received at the primary microphone 106. The noise estimate may then be provided to the echo mask generator 308 and the total noise estimate module 310.

The echo mask is then generated in step 610. Step 610 will be discussed in more detail in connection with FIG. 7 below. A noise suppression gain mask is generated in step 612. In exemplary embodiments a total noise estimate that may be echo free is determined by the total noise estimate module 310. In exemplary embodiments, the total noise estimate is determined for each frequency sub-band. In exemplary embodiments, the total noise estimate module 310 is configured to compute an estimate of the near-end noise power spectrum (e.g., time and frequency dependent portion of the acoustic signal that is not from the acoustic source 102). In some embodiments, the total noise estimate module 310 may refine the noise estimate received from the noise estimate module 306, which may be corrupted by echo power. The noise suppression gain mask may then be generated using the total noise estimate by the noise mask generator 312.

In step 614, a combined echo/noise suppression mask is generated. In exemplary embodiments, the combined echo and noise mask integration module 314 generates the combined echo/noise suppression mask. In one embodiment, the echo and noise mask integration module 314 may select a minimum between the two gain masks (i.e., noise mask and echo mask) for each sub-band, with a lower limit on how far below the noise mask the combined mask can be.

The result of the echo and noise mask integration module 314 is a final gain mask that may be used for modification of the primary acoustic signal from the primary microphone 106 in step 616. The modified signal may then be reconstructed and output.

Figure 7:
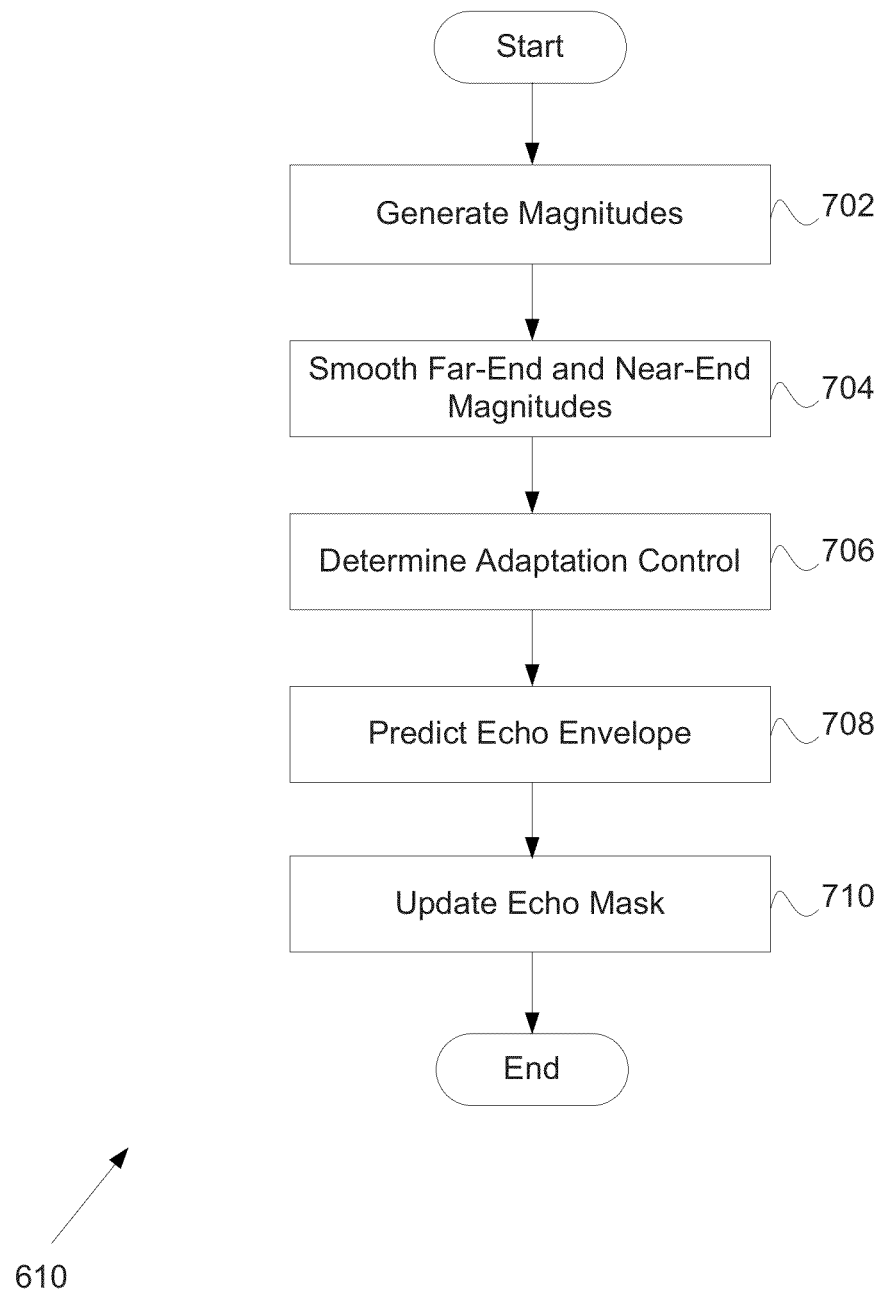
FIG. 7 is a flowchart of an exemplary method for determining an echo mask.

Referring now to FIG. 7, an exemplary flowchart of a method for generating the echo mask (step 610) is shown. In step 702, envelopes of the echo-free noise, far-end signal, and near-end signal (i.e., primary acoustic signal) are determined.

In exemplary embodiments, the echo mask generator 308 receives the noise estimate, far-end signal energy spectra, and near-end signal energy spectra. These estimates and spectra are subjected to a square-root (sqrt) operation in the sqrt module 402. The sqrt operation transforms the power spectrum into magnitudes. For a given frequency band, a sequence of such magnitudes over time comprises an envelope (e.g., one amplitude per frame).

The far-end and near-end envelopes are then smoothed in step 704. The temporal smoothing removes "wiggles" in the envelope that may not be important for echo suppression. In one embodiment, the smoothing may be performed using a leaky integrator.

In step 706, the echo envelope is predicted. The echo predictor 406 is configured to use the far-end envelope (per frequency band) to predict its echo in the near-end envelope. In one embodiment, the echo predictor 406 may be simplified by assuming that the echo envelope is just a delayed and scaled version of the far-end envelope. In some embodiments, this representation may provide an accurate estimate due to low temporal resolution of the envelope (which is bolstered by smoothing).

The gain mask may be generated or updated in step 708. The gain mask may be generated by looking at a ratio between the echo prediction and the echo prediction power from the total near-end power.

Figure 8:
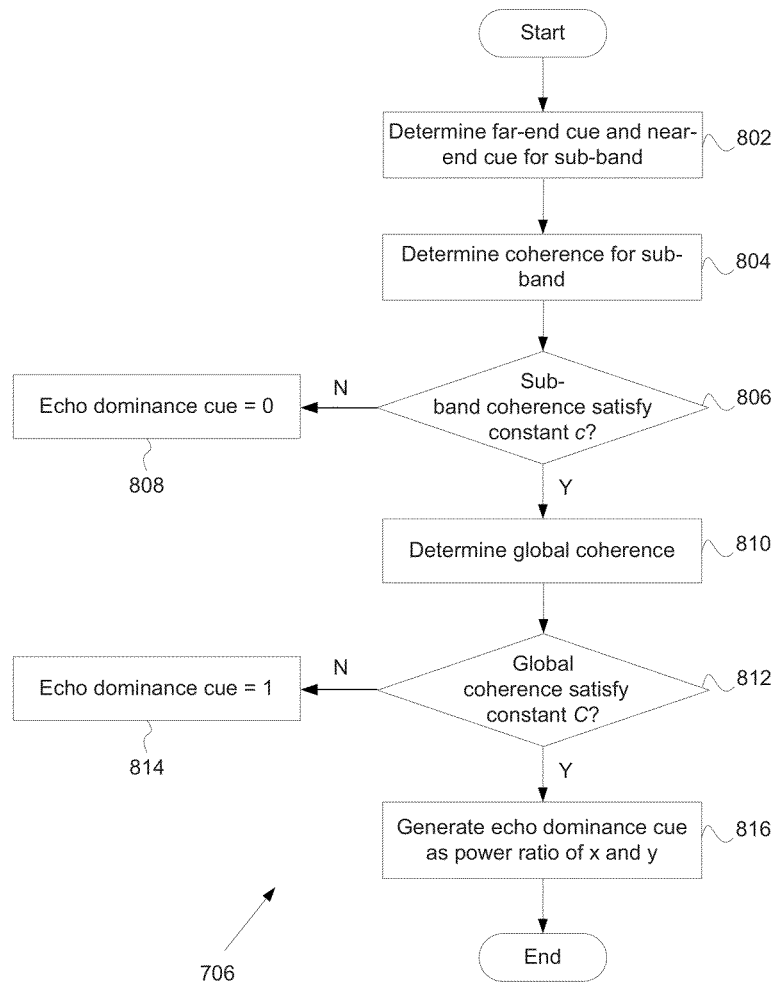
FIG. 8 is a flowchart of an exemplary method for determining adaption control.

FIG. 8 is a flowchart of an exemplary method for determining adaption control. In some embodiments, the method of FIG. 8 can be performed for each sub-band in a frame. A far end cue and near-end cue are determined for the sub-band at step 802. As discussed above, the far-end cue value is set based on whether the far-end signal is greater than the long term average value of x. The near-end cue value is set based on whether the near end signal is greater than the noise power spectrum.

As part of determining an echo dominance cue, a coherence for the current sub-band is determined at step 804. The coherence can be determined based on the far-end signal and near-end signal as discussed above with respect to equations (12) and (14). A determination is then made as to whether the coherence for the sub-band satisfies a constant $c_i$ for the current $i^{th}$ sub-band at step 806. The coherence can satisfy the constant $c_i$ if the coherence value is less than or equal to the value of $c_i$. If the coherence is less than or equal to the value of constant $c_i$, the echo dominance cue is set to a value of zero at step 808. The resulting value of μ output by adaption control 414 will also be zero.

If the coherence is more than the value of constant $c_i$, the global coherence is determined at step 810. The global coherence can be determined as the sum of the sub-band coherence values divided by the number of sub-bands or taps (e.g., the average coherence over all the sub-bands). A determination is then made as to whether the global coherence satisfies a constant C at step 812. The determination detects double talk that provides a high local coherence but a low global coherence. It is important to detect double-talk as distinguished from echo so as not to reduce the near-end signal for mistakenly identifying echo. The global coherence can satisfy the constant C if the global coherence has a value less than the constant C. If the global coherence satisfies the constant C, the echo dominance cue can be determined as a power ratio between the near end signal and the far-end signal. If the global coherence does not satisfy the constant C, the echo dominance cue can be set to a value of one.

Embodiments of the present technology adaptively estimate gain using the gain updater 412. In some embodiments, gain is updated quickly when echo is dominating the near-end signal, and updated slowly or not at all otherwise. In exemplary embodiments, the adaptation control module 414 provides the information necessary to determine how quickly to update gain. In some embodiments, the information may come in a form of a frame- and frequency-varying parameter μ. The larger μ is, the faster g is updated.

The above-described modules can be comprised of instructions that are stored on storage media. The instructions can be retrieved and executed by the processor 202. Some examples of instructions include software, program code, and firmware. Some examples of storage media comprise memory devices and integrated circuits. The instructions are operational when executed by the processor 202 to direct the processor 202 to operate in accordance with embodiments of the present technology. Those skilled in the art are familiar with instructions, processor(s), and storage media.

The present technology is described above with reference to exemplary embodiments. It will be apparent to those skilled in the art that various modifications may be made and other embodiments can be used without departing from the broader scope of the present technology. For example, embodiments of the present technology may be applied to any system (e.g., non speech enhancement system) utilizing AEC. Therefore, these and other variations upon the exemplary embodiments are intended to be covered by the present technology.

The invention claimed is:

1. A method for acoustic echo cancellation, comprising:
receiving a primary acoustic signal via a primary microphone and a far-end signal via a receiver;
adapting a plurality of echo gains based on a coherence value between the primary acoustic signal and the far-end signal;
adjusting a speed of adaptation for each echo gain of the plurality of echo gains, the adjusting the speed of adaptation being based on detecting that the coherence value for a sub-band satisfies a threshold;
applying the plurality of the adapted echo gains to the far-end signal to generate a predicted echo signal;
configuring an echo mask based on the predicted echo signal and the primary acoustic signal;
applying the configured echo mask to the primary acoustic signal to generate a masked signal; and
outputting the masked signal.

2. The method of claim 1, wherein the coherence value is measured in sub-bands of the primary acoustic signal and the far-end signal.

3. The method of claim 1, wherein the configured echo mask is applied to selected sub-bands of the primary acoustic signal.

4. The method of claim 1, wherein adapting a plurality of echo gains includes determining a normalized coherence between the primary acoustic signal and the far-end signal.

5. The method of claim 1, further comprising performing frequency analysis on the primary acoustic signal and the far-end acoustic signal to obtain frequency sub-bands for the primary and far-end acoustic signals.

6. The method of claim 1, wherein adjusting a speed of adaptation for each echo gain comprises updating each echo gain based on one or more adaptation control cues.

7. The method of claim 6, wherein the one or more adaptation control cues comprise an adaptive far-end noise floor.

8. The method of claim 6, wherein the one or more adaptation control cues comprise a noise floor.

9. The method of claim 6, wherein the one or more adaptation control cues comprise an echo dominance cue associated with the coherence value.

10. The method of claim 1, further comprising synthesizing the masked signal into time domain for outputting.

11. The method of claim 1, wherein the echo mask is applied as a gain mask.

12. A method for acoustic echo cancellation, comprising:
receiving a primary acoustic signal via a primary microphone and a far-end signal via a receiver;
adapting an echo gain based on a coherence value between the primary acoustic signal and the far-end signal;
adjusting a speed of the echo gain adaptation based on a first ratio between the primary acoustic signal and the far-end signal;
applying the adapted echo gain to the far-end signal to generate a predicted echo signal;
configuring an echo mask based on the predicted echo signal and the primary acoustic signal;
applying the echo mask to the primary acoustic signal to generate a masked signal; and
outputting the masked signal.

13. The method of claim 12, wherein the first ratio is a power ratio.

14. The method of claim 12, wherein adjusting the speed of the echo gain adaptation includes detecting that a global coherence value satisfies a threshold.

15. The method of claim 12, wherein adjusting the speed of the echo gain adaptation includes detecting that the coherence value for a sub-band satisfies a threshold.

16. The method of claim 12, wherein adjusting the speed of the echo gain adaptation includes reducing the speed of the echo gain adaptation during doubletalk.

17. A method for acoustic echo cancellation, comprising:
receiving a primary acoustic signal via a primary microphone and a far-end signal via a receiver;
determining a coherence value between the primary acoustic signal and the far-end acoustic signal, wherein the coherence value is determined from a cochlea filter output;
adapting a plurality of echo gains based on the coherence value;
adjusting a speed of adaptation for each echo gain of the plurality of echo gains, the adjusting the speed of adaptation being based on detecting that the coherence value for a sub-band satisfies a threshold;
applying the plurality of the adapted echo gains to the far-end signal to generate a predicted echo signal;
configuring an echo mask based on the predicted echo signal and the primary acoustic signal;
applying the configured echo mask to the primary acoustic signal to generate a masked signal; and
outputting the masked signal.

18. The method of claim 17, further comprising obtaining frequency sub-bands for the primary and far-end acoustic signals, wherein the coherence value is determined based on the cochlea filter output for all sub-bands.

19. The method of claim 17, further comprising performing frequency analysis on the primary acoustic signal and the far-end acoustic signal to obtain frequency sub-bands for the primary acoustic signal and far-end acoustic signal.

20. The method of claim 17, wherein the coherence value is determined based on a phase difference between the primary acoustic signal and the far-end acoustic signal.

21. The method of claim 17, wherein the coherence value is determined based on an exponential function.

22. The method of claim 20, wherein the phase difference is computed using decimation of the cochlea filter output.

23. A system for acoustic echo cancellation in a communication device, comprising:
acoustic sensors configured to receive a primary acoustic signal and a far-end acoustic signal;
an echo mask generator configured to:
generate an echo mask based on a predicted echo signal and the primary acoustic signal;
adapt a plurality of echo gains based on a coherence value between the primary acoustic signal and the far-end acoustic signal;
adjust an adaptation speed for each echo gain of the plurality of echo gains, the adjustment being based on detecting that the coherence value for a sub-band satisfies a threshold; and
apply the plurality of the adapted echo gains to the far-end signal to generate a predicted echo signal;
a modifier module configured to apply the generated echo mask to the primary acoustic signal to generate a masked signal; and
an output device configured to output the masked signal.

24. The system of claim 23, wherein the echo mask generator is further configured to adjust the adaption speed of each echo gain of the plurality of echo gains based on a first ratio between the primary acoustic signal and the far-end acoustic signal.

25. The system of claim 23, wherein the echo mask generator is further configured to determine the coherence value based on a phase difference between the primary acoustic signal and the far-end acoustic signal.

* * * * *